United States Patent
Konno et al.

(10) Patent No.: US 7,805,284 B2
(45) Date of Patent: Sep. 28, 2010

(54) SIMULATION MODEL DEFINING SYSTEM FOR GENERATING A SIMULATION PROGRAM FOR A SIMULATOR SIMULATING A BEHAVIOR OF ECONOMY OR SOCIETY REGARDED AS A SYSTEM OF PHENOMENA AND EVENTS

(75) Inventors: Hiroyuki Konno, Yokohama (JP); Kenichi Funaki, Tokyo (JP); Takahiro Ogura, Kodaira (JP); Akira Nagamatsu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 211 days.

(21) Appl. No.: 11/867,412

(22) Filed: Oct. 4, 2007

(65) Prior Publication Data

US 2009/0094007 A1 Apr. 9, 2009

(51) Int. Cl.
*G06F 7/60* (2006.01)
(52) U.S. Cl. .............................. 703/2; 703/6
(58) Field of Classification Search .............. 703/2, 703/6
See application file for complete search history.

(56) References Cited

U.S. PATENT DOCUMENTS

| | | | | |
|---|---|---|---|---|
| 6,931,365 | B1 * | 8/2005 | Mehta et al. | 703/1 |
| 7,130,779 | B2 * | 10/2006 | Beverina et al. | 703/6 |
| 2001/0027388 | A1 * | 10/2001 | Beverina et al. | 703/22 |
| 2001/0027389 | A1 * | 10/2001 | Beverina et al. | 703/22 |

OTHER PUBLICATIONS

Quijada et al., A spatio temporal simulation model for evaluating delinquency and crime policies, 2005, Winter Simulation Conference, pp. 1328-1334.*
Brantingham et al., A Computational Model for Simulating Spatial Aspects of Crime in Urban Environments, Oct. 2005, Systems, Man and Cybernetics, 2005 IEEE International Conference, vol. 4, on pp. 3667-3674.*
Groff, Simulation for Theory Testing and Experimentation: An Example Using Routine Activity Theory and Street Robbery, Feb. 2007, Springer Netherlands, vol. 23, pp. 75-103.*
J. W. Forrester, Market Growth as Influenced by Capital Investment, Industrial Management Review, vol. IX, No. 2, Winter 1968, pp. 1-23.

* cited by examiner

*Primary Examiner*—Paul L Rodriguez
*Assistant Examiner*—Aniss Chad
(74) *Attorney, Agent, or Firm*—Mattingly & Malur, P.C.

(57) ABSTRACT

An issue to be settled by the present invention is to define a simulation model in accordance with the structure of a causal relation easy to be understood by human and to shorten greatly a simulation program development period. A simulation program is automatically generated by extracting, as nodes, specific items such as phenomenon, events and targets of constituent elements of economy, society or the like regarded as a system, coupling the nodes with arcs to define the structure of the causal relation, and defining a variable necessary for calculating metrics and a calculation formula therefor, relative to a simulation model inheriting the defined structure.

2 Claims, 15 Drawing Sheets

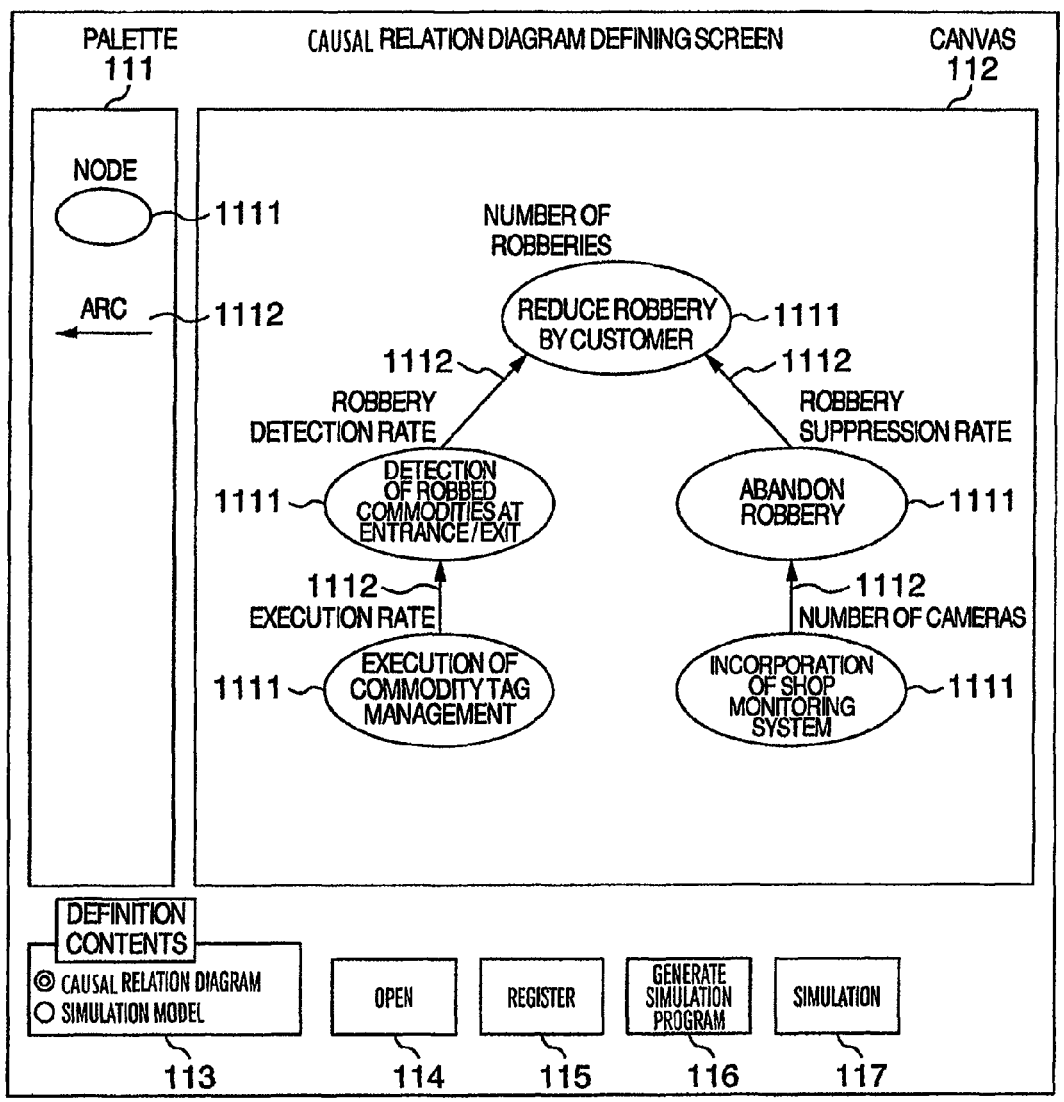

FIG.8

NODE TABLE 201

| | | | | |
|---|---|---|---|---|
| MODEL 1 | REDUCE ROBBERY BY CUSTOMER | 200,200 | ... | ... |
| MODEL 1 | DETECTION OF ROBBED COMMODITIES AT ENTRANCE / EXIT | 100,300 | ... | ... |
| MODEL 1 | EXECUTION OF COMMODITY TAG MANAGEMENT | 100,400 | ... | ... |
| MODEL 1 | ABANDON ROBBERY | 300,300 | ... | ... |
| MODEL 1 | INCORPORATION OF SHOP MONITORING SYSTEM | 300,400 | ... | ... |

FIG.9

ARC TABLE 202

| | | | |
|---|---|---|---|
| MODEL 1 | 1 | ABANDON ROBBERY | REDUCE ROBBERY BY CUSTOMER |
| MODEL 1 | 2 | DETECTION OF ROBBED COMMODITIES AT ENTRANCE / EXIT | REDUCE ROBBERY BY CUSTOMER |
| MODEL 1 | 3 | EXECUTION OF COMMODITY TAG MANAGEMENT | DETECTION OF ROBBED COMMODITIES AT ENTRANCE / EXIT |
| MODEL 1 | 4 | INCORPORATION OF SHOP MONITORING SYSTEM | ABANDON ROBBERY |

FIG.12
VARIABLE TABLE 203

| | | | | | | | | |
|---|---|---|---|---|---|---|---|---|
| MODEL 1 | NUMBER OF ROBBERIES | METRICS | ... | ... | ... | REDUCE ROBBERY BY CUSTOMER | CALCULATION FORMULA | NUMBER OF INCOMING CUSTOMERS × ROBBERY RATE × (1 - ROBBERY SUPPRESSION RATE) |
| MODEL 1 | ROBBERY SUPPRESSION RATE | METRICS | ... | ... | ... | ABANDON ROBBERY | GRAPH FUNCTION | |
| MODEL 1 | NUMBER OF CAMERAS | METRICS | ... | ... | ... | INCORPORATION OF SHOP MONITORING SYSTEM | CALCULATION FORMULA | 5 |
| MODEL 1 | ROBBERY DETECTION RATE | METRICS | ... | ... | ... | DETECTION OF ROBBED COMMODITIES AT ENTRANCE / EXIT | CALCULATION FORMULA | ... |
| MODEL 1 | EXECUTION RATE | METRICS | ... | ... | ... | EXECUTION OF COMMODITY TAG MANAGEMENT | CALCULATION FORMULA | ... |
| MODEL 1 | ROBBERY RATE | CONSTANT | ... | ... | ... | REDUCE ROBBERY BY CUSTOMER | CALCULATION FORMULA | 1.0 |
| MODEL 1 | NUMBER OF INCOMING CUSTOMERS | CONSTANT | ... | ... | ... | REDUCE ROBBERY BY CUSTOMER | CALCULATION FORMULA | 10000 |
| MODEL 1 | RATE 1 | RATE VARIABLE | ... | ... | ... | REDUCE ROBBERY BY CUSTOMER | CALCULATION FORMULA | NUMBER OF ROBBERIES |
| MODEL 1 | ACCUMULATED NUMBER OF ROBBERIES | LEVEL VARIABLE | ... | ... | ... | REDUCE ROBBERY BY CUSTOMER | CALCULATION FORMULA | 0 |
| MODEL 2 | L1 | LEVEL VARIABLE | ... | ... | ... | ... | CALCULATION FORMULA | 0 |
| MODEL 2 | L2 | LEVEL VARIABLE | ... | ... | ... | ... | CALCULATION FORMULA | 0 |
| MODEL 2 | R1 | LEVEL VARIABLE | ... | ... | ... | ... | CALCULATION FORMULA | 3 |
| MODEL 2 | R2 | LEVEL VARIABLE | ... | ... | ... | ... | CALCULATION FORMULA | 2 |
| MODEL 2 | R3 | LEVEL VARIABLE | ... | ... | ... | ... | CALCULATION FORMULA | 1 |

| X-AXIS VARIABLE | DEFINITION RANGE LOWER LIMIT | DEFINITION RANGE HIGHER LIMIT | STEP | Y-AXIS COORDINATE VALUE |
|---|---|---|---|---|
| NUMBER OF CAMERAS | 0, | 40, | 5, | 0 / 0.25 / 0.48 / 0.65 / 0.75 / 0.80 / 0.85 / 0.89 / 0.90 |

FIG.13
LINK TABLE 204

| | | | |
|---|---|---|---|
| MODEL 1 | 1 | NUMBER OF CAMERAS | ROBBERY SUPPRESSION RATE |
| MODEL 1 | 2 | ROBBERY SUPPRESSION RATE | NUMBER OF ROBBERIES |
| MODEL 1 | 3 | ROBBERY RATE | NUMBER OF ROBBERIES |
| MODEL 1 | 4 | NUMBER OF INCOMING CUSTOMERS | NUMBER OF ROBBERIES |
| MODEL 1 | 5 | NUMBER OF CAMERAS | NUMBER OF CAMERAS |
| MODEL 1 | 6 | RATE 1 | ACCUMULATED NUMBER OF ROBBERIES |
| MODEL 2 | 1 | L2 | R3 |
| MODEL 2 | 2 | R2 | L2 |
| MODEL 2 | 3 | L1 | R2 |
| MODEL 2 | 4 | R1 | L1 |

FIG.15

CALCULATION MODEL DEFINING SCREEN

VARIABLE NAME: NUMBER OF ROBBERIES
VARIABLE TYPE: METRICS
CALCULATION MODEL: ◉ CALCULATION FORMULA   ○ GRAPH FUNCTION

[OK] [CANCEL]

DEFINITION CONTENTS:
NUMBER OF INCOMING CUSTOMERS × ROBBERY RATE × (1 - ROBBERY SUPPRESSION RATE)

CAUSE VARIABLE LIST:
ROBBERY SUPPRESSION RATE
NUMBER OF INCOMING CUSTOMERS
ROBBERY RATE

FIG.16

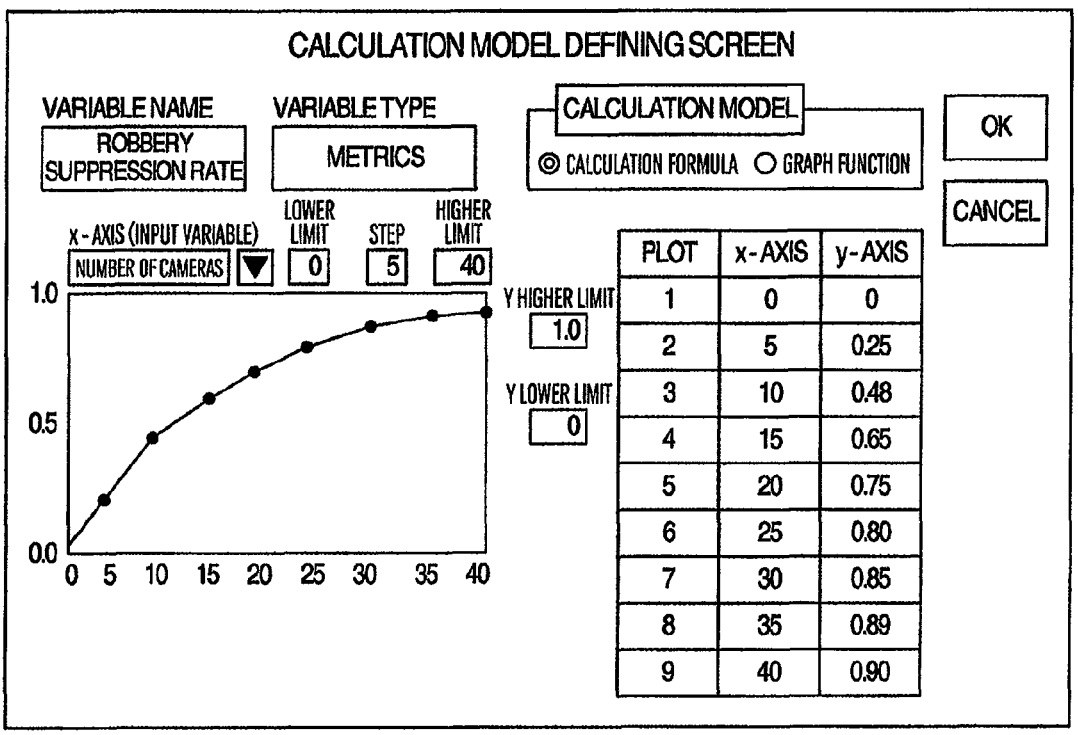

CALCULATION MODEL DEFINING SCREEN

VARIABLE NAME: ROBBERY SUPPRESSION RATE
VARIABLE TYPE: METRICS
CALCULATION MODEL: ◉ CALCULATION FORMULA   ○ GRAPH FUNCTION

[OK] [CANCEL]

x-AXIS (INPUT VARIABLE): NUMBER OF CAMERAS
LOWER LIMIT: 0   STEP: 5   HIGHER LIMIT: 40
Y HIGHER LIMIT: 1.0
Y LOWER LIMIT: 0

| PLOT | x-AXIS | y-AXIS |
|------|--------|--------|
| 1 | 0 | 0 |
| 2 | 5 | 0.25 |
| 3 | 10 | 0.48 |
| 4 | 15 | 0.65 |
| 5 | 20 | 0.75 |
| 6 | 25 | 0.80 |
| 7 | 30 | 0.85 |
| 8 | 35 | 0.89 |
| 9 | 40 | 0.90 |

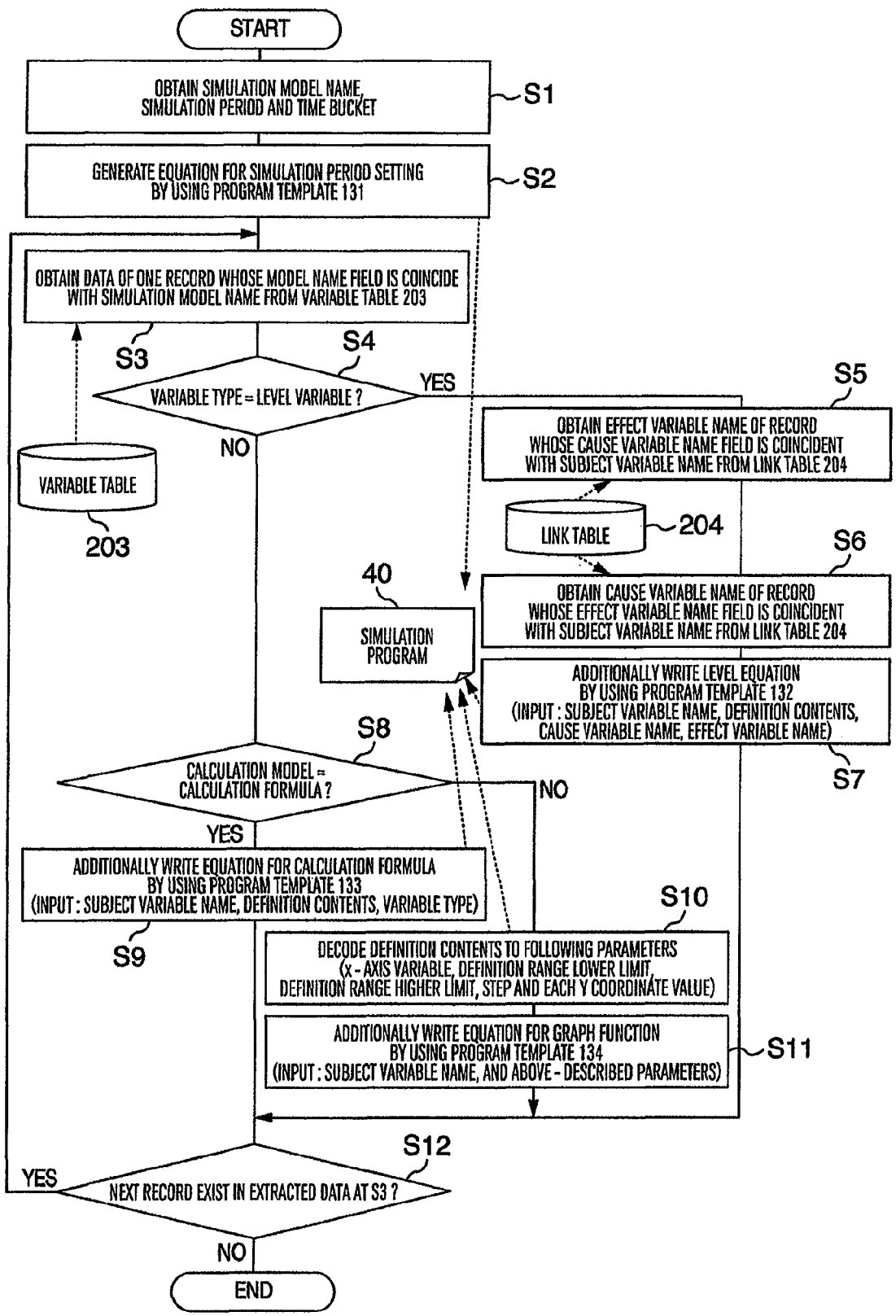
FIG.19  SIMULATION PROGRAM GENERATING FLOW CHART

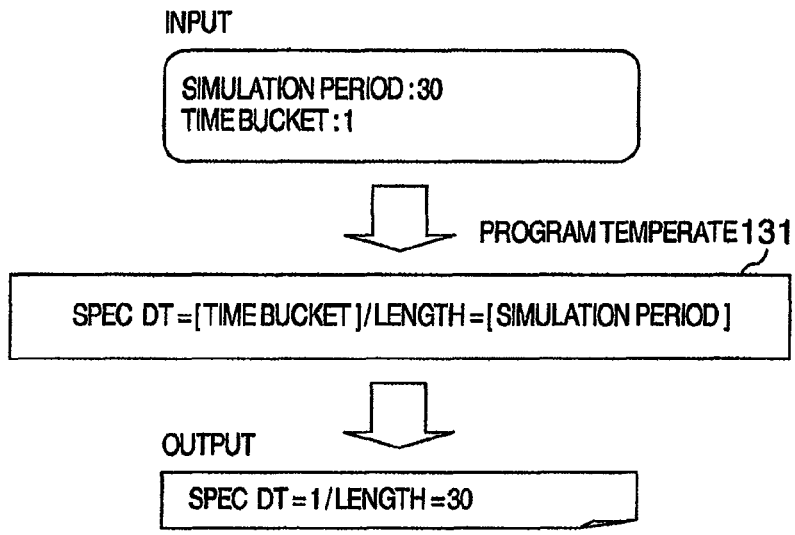
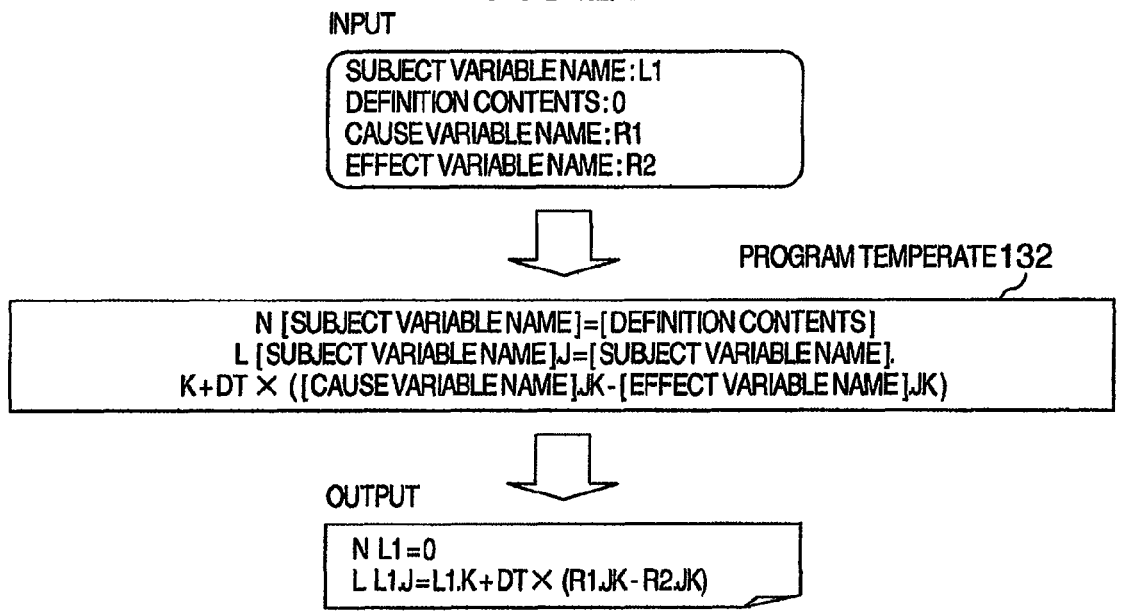

FIG.22

INPUT

SUBJECT VARIABLE NAME : R1
DEFINITION CONTENTS : 3
VARIABLE TYPE : RATE VARIABLE

PROGRAM TEMPERATE 133

[EQUATION TYPE] [SUBJECT VARIABLE NAME] [SUFFIX] = [DEFINITION CONTENTS]

OUTPUT

| VARIABLE TYPE | EQUATION TYPE | SUFFIX |
|---|---|---|
| RATE VARIABLE | R | .KL |
| CONSTANT | C | — |
| AUXILIARY VARIABLE | A | .K |
| METRICS | A | .K |

FIG.24

INPUT

SUBJECT VARIABLE NAME : ROBBERY SUPPRESSION RATE,
x- AXIS VARIABLE : NUMBER OF CAMERAS,
DEFINITION RANGE LOWER LIMIT : 0, DEFINITION RANGE HIGHER LIMIT : 40, STEP : 5
EACH Y COORDINATE VALUE : 0 / 0.25 / 0.48 / 0.65 / 0.75 / 0.80 / 0.85 / 0.89 / 0.90

PROGRAM TEMPERATE 134

A [SUBJECT VARIABLE NAME] = TABLE (y- AXIS _ [SUBJECT VARIABLE NAME], [x- AXIS VARIABLE],
[DEFINITION RANGE LOWER LIMIT], [DEFINITION RANGE HIGHER LIMIT], [STEP])
T y- AXIS _ [SUBJECT VARIABLE NAME] = [EACH Y COORDINATE VALUE]

OUTPUT

A ROBBERY SUPPRESSION RATE =
TABLE (y- AXIS _ ROBBERY SUPPRESSION RATE, NUMBER OF CAMERAS, 0, 40, 5)
T y- AXIS _ ROBBERY SUPPRESSION RATE = 0 / 0.25 / 0.48 / 0.65 / 0.75 / 0.80 / 0.85 / 0.89 / 0.90

FIG.25

```
SPEC DT=1/LENGTH=30
PLOT ACCUMULATED NUMBER OF ROBBERIES,RATE 1,NUMBER OF CAMERAS,ROBBERY SUPPRESSION RATE,NUMBER OF ROBBERIES
R RATE 1.KL=NUMBER OF ROBBERIES.K
A NUMBER OF CAMERAS.K=5
A ROBBERY SUPPRESSION RATE.K=TABHL(y-AXIS_ROBBERY SUPPRESSION RATE,NUMBER OF CAMERAS.K,0,40,5)
T y-AXIS_ROBBERY SUPPRESSION RATE=0/0.025/0.48/0.65/0.75/0.80/0.85/0.89/0.90
A NUMBER OF ROBBERIES.K=NUMBER OF INCOMING CUSTOMERS × ROBBERY RATE × (1-ROBBERY SUPPRESSION RATE.K)
C ROBBERY RATE=1.0
C NUMBER OF INCOMING CUSTOMERS=10000
N ACCUMULATED NUMBER OF ROBBERIES=0
L ACCUMULATED NUMBER OF ROBBERIES.K=ACCUMULATED NUMBER OF ROBBERIES.J+DT × RATE 1.JK
```

FIG.26

```
SPEC DT=1/LENGTH=30
R R1.KL=3
R R2.KL=2
R R3.KL=1
N ACCUMULATED NUMBER OF ROBBERIES=0
L ACCUMULATED NUMBER OF ROBBERIES.K=ACCUMULATED NUMBER OF ROBBERIES.J+DT × RATE 1.JK
N L1=0
L L1K=L1J+DT × (R1.K-R2.JK)
N L2=0
L L2K=L2J+DT × (R2.K-R3.JK)
```

SIMULATION MODEL DEFINING SYSTEM FOR GENERATING A SIMULATION PROGRAM FOR A SIMULATOR SIMULATING A BEHAVIOR OF ECONOMY OR SOCIETY REGARDED AS A SYSTEM OF PHENOMENA AND EVENTS

BACKGROUND OF THE INVENTION

1. Field of the Invention

The present invention relates to a model defining method for defining a model for simulating a behavior of economy, society or the like regarded as a system, the model representing a relation between phenomena and events between constituent elements of the system, as a causal relation.

2. Description of the Related Art

In order to speed up decision making such as what price is to be set to a new product and whether or not a business system is incorporated, it is important to estimate the effects quickly through simulation. For example, when a price of a new product is to be determined, it is desired to estimate how the number of orders changes with the price set to the new product and influences the final sales. In modeling the phenomenon propagating and changing chains of causal relation such as price, the number of orders, and sales, it is desired to model the structure of causal relation itself.

As a conventional method of simulating the behavior such as social phenomena by using the structure of causal relation, system dynamics are known which have been developed by Forrester at MIT.

DYNAMO is known as a simulation language of system dynamics. A simulation program is configured by using a rate variable representative of a flow rate of articles per unit time and a level variable representative of an accumulation amount of flow rates, and setting an equation to these variables. The causal relation can be expressed by regarding the causal relation as a relation between the rate variable and level variable.

In modeling simulation, the equation has been set conventionally while the structure of causal relation easy to be understood by human is translated into a conventional simulation language. It takes therefore a time to develop a simulation program. Since the simulation program has poor readability, reuse and modification thereof are difficult.

SUMMARY OF THE INVENTION

In order to settle the above-described issue of the present invention, there is provided a simulation model defining system a simulation model defining system for automatically generating a simulation program for simulating a behavior of economy or society regarded as a system, a relation between constituent elements of the system being represented by a causal relation, comprising:

a causal relation diagram defining unit for extracting, as nodes, specific items such as phenomenon, events and targets of the constituent elements, creating a causal relation by coupling the nodes with arcs, and setting metrics quantitatively representing a state amount to each of the nodes, to draw a causal relation diagram;

a node table for storing a node name and drawing coordinates of each of the nodes;

an arc table for storing node information on each of the nodes coupled to each of the arcs;

a simulation model defining unit for adding a variable necessary for calculating the metrics to a simulation base model inheriting a structure of the causal relation of the causal relation diagram, explicitly writing a flow direction of information by extending a link between the metrics and the variable, and setting a calculation formula relative to the metrics and the variable, to define a simulation model;

a variable table for storing information on a variable name, a variable type, a calculation model for identifying a calculation formula to be set, and the calculation formula, for each of the metrics and the variable;

a link table for storing information on the variable connected to each of the link;

a database for storing data of each of the tables and collectively managing the data; and a simulation program generating unit for automatically generating a simulation program in accordance with the data registered in the database.

According to the present invention, a simulation model can be defined in accordance with the structure of causal relation easy to be understood by human, and a development time of a simulation program can be reduced considerably. Even a novice not having the knowledge of system dynamics can generate a simulation model and simulate various phenomena.

BRIEF DESCRIPTION OF THE DRAWINGS

FIG. 6 is a diagram showing the node setting screen with input data.

FIG. 7 is a diagram showing a registration confirming screen.

FIG. 8 is a diagram showing a node table.

FIG. 9 is a diagram showing an arc table.

FIG. 12 is a diagram showing a variable table.

FIG. 13 is a diagram showing a link table.

FIG. 15 is a diagram showing a calculation model defining screen with input data when a calculation model is for a calculation formula.

FIG. 16 is a diagram showing the calculation model defining screen when a calculation model is for a graph function.

FIG. 19 is a flow chart illustrating a process of generating a simulation program.

FIG. 20 is a diagram showing a simulation template 131.

FIG. 21 is a diagram showing a simulation template 132.

FIG. 22 is a diagram showing a simulation template 133.

FIG. 23 is a diagram showing a correspondence table of variable types.

FIG. 24 is a diagram showing a simulation template 134.

FIG. 25 shows an example of an automatically generated simulation program.

FIG. 26 shows an example of an automatically generated simulation program.

DETAILED DESCRIPTION OF THE EMBODIMENTS

With reference to the accompanying drawings, description will be made on a simulation model defining system according to an embodiment of the present invention. In this embodiment, simulation is performed on how the number of robberies changes if a shop suffering robbery of commodities introduces a commodity tag management system or a shop monitoring system, and description will be made on a sequence of automatically generating a simulation program at a final stage. In this embodiment, although a DYNAMO simulation program is automatically generated, the invention is not necessarily limited to DYNAMO.

Figure 1:
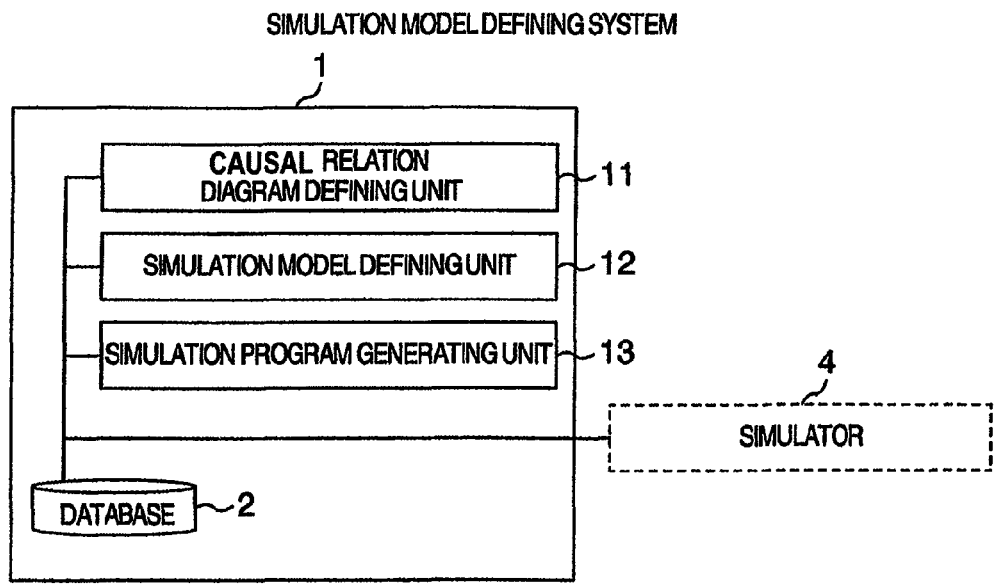
FIG. 1 is a block diagram showing an information processing system for realizing a simulation model defining system according to an embodiment of the present invention.

First, description will be made on the entire configuration of a simulation model defining system of the present invention. FIG. 1 is a block diagram showing an information processing system realizing the simulation model defining system according to an embodiment of the present invention As shown in FIG. 1, the simulation model defining system 1 has: a causal relation diagram defining unit 11 for regarding a shop suffering from robbery of commodities as a system, writing constituent elements of the system as nodes which nodes represent specific items of the concepts such as phenomena, events and targets, creating a causal relation by coupling the nodes with arcs, and setting metrics for quantitatively expressing the state to each node; a simulation model defining unit 12 for inheriting the structure of the causal relation, adding a variable necessary for calculating the metrics and setting a calculation formula therefor; a simulation program generating unit 13 for automatically generating a simulation program from the defined simulation model; and a database 2 for storing execution results of each unit. A simulator 4 executes the simulation program.

Figure 2:
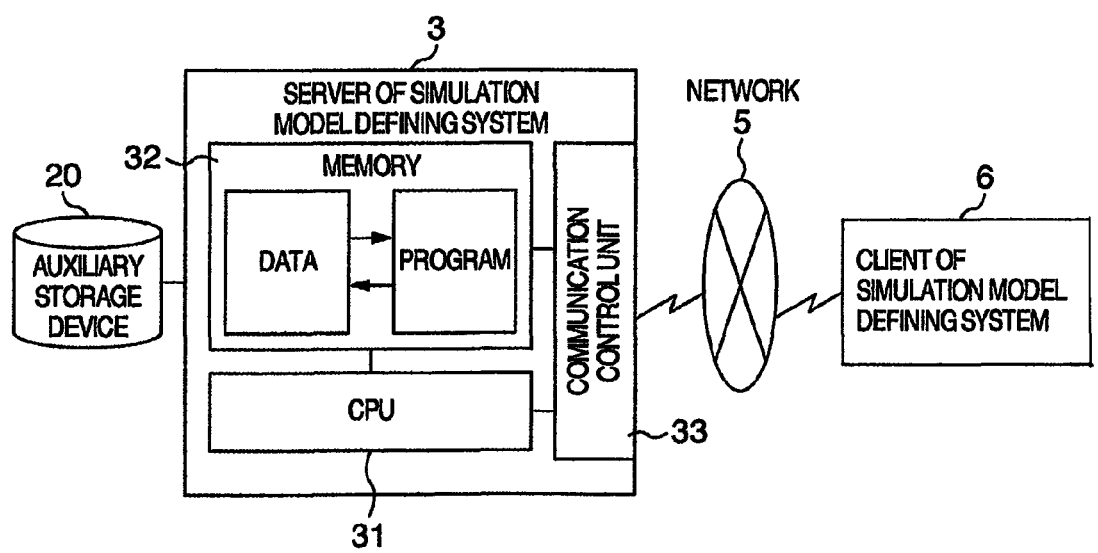
FIG. 2 shows a hardware structure of the simulation model defining system of the embodiment.

Next, description will be made on the hardware structure of the simulation model defining system 1. FIG. 2 is a diagram showing the hardware structure of the simulation model defining system 1 of the embodiment. The simulation model defining system 1 runs on a server 3, i.e., a computer of the simulation model defining system 1. The server 3 of the simulation model defining system 1 has a CPU 31, a memory 32, a communication control unit 33 and an auxiliary storage device 20.

Each unit described with reference to FIG. 1 is stored in the auxiliary storage device 20 as programs of the simulation model defining system, and read to the memory 32 when necessary and processed by CPU 31.

Similarly, the database 2 is stored as a relational database or a file in the auxiliary storage device 20, and data is read to the memory 32 when necessary and used by each program.

Data of the programs of the simulation model defining system required by the server 3 can be generated by a computer at a client 6 of the programs of the simulation model defining system, and can be registered in the auxiliary storage device 20 via a network 5. The client 6 of the simulation model defining system may be structured integrally with the server 3 of the simulation model defining system, without involving the network 5.

Figure 3:
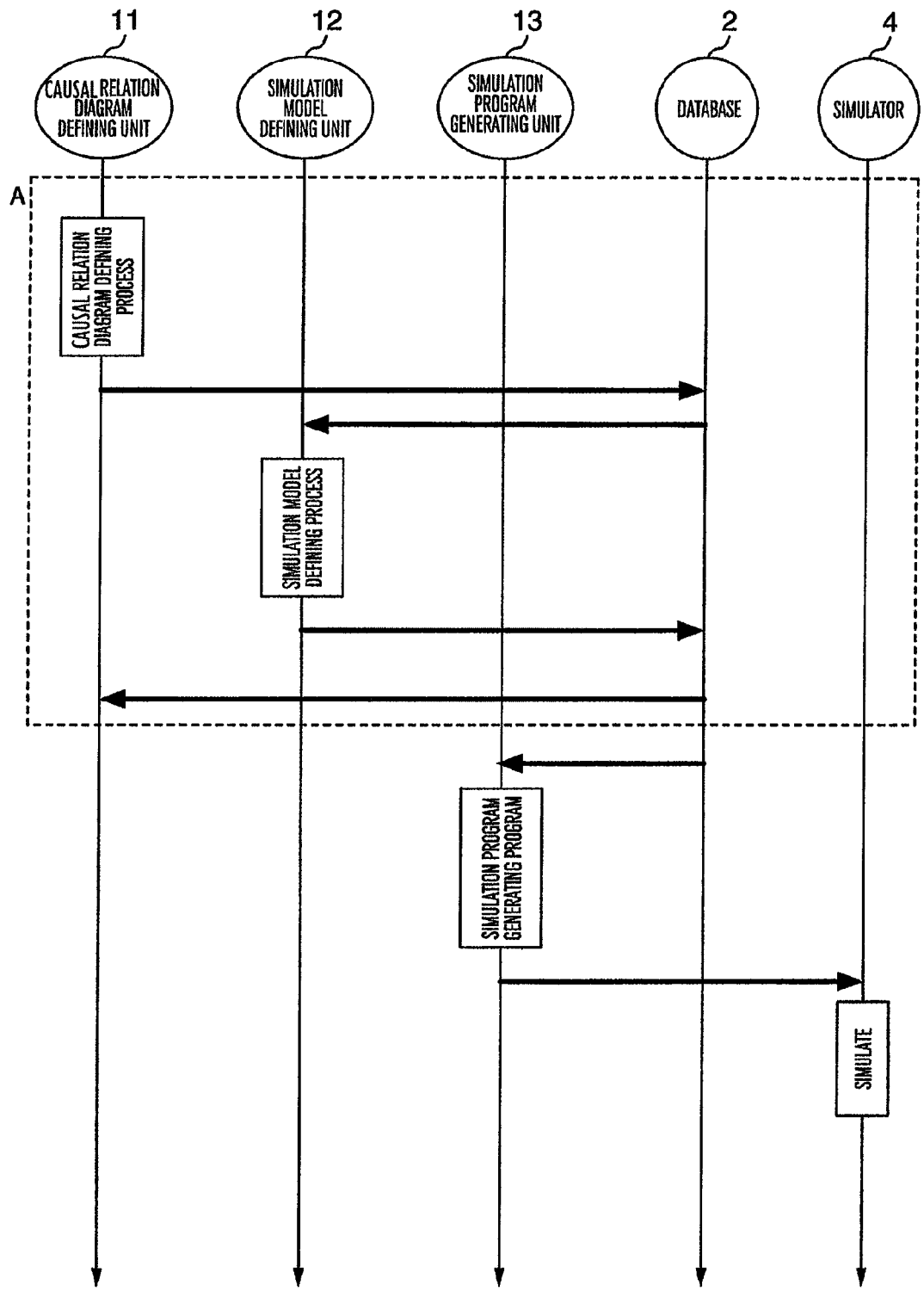
FIG. 3 is a time sequential diagram illustrating data transfer among each unit, a database and a simulator, respectively of the simulation model defining system.

FIG. 3 is a time sequential diagram illustrating the information transfer between each unit of the simulation model defining system 1 described with reference to FIG. 1 and the database 2. FIGS. 4 to 26 are diagrams showing input/output data of each unit described with reference to FIG. 3, screens and various algorithms. Description will now be made with reference to FIG. 3 and FIGS. 4 to 26.

First, description will be made on the operation sequence to be executed by the causal relation diagram defining unit 11 and simulation model defining unit 12 shown at A in FIG. 3, up to a process of registering data necessary for generating the simulation program in the database 2.

Figures 4, 5:
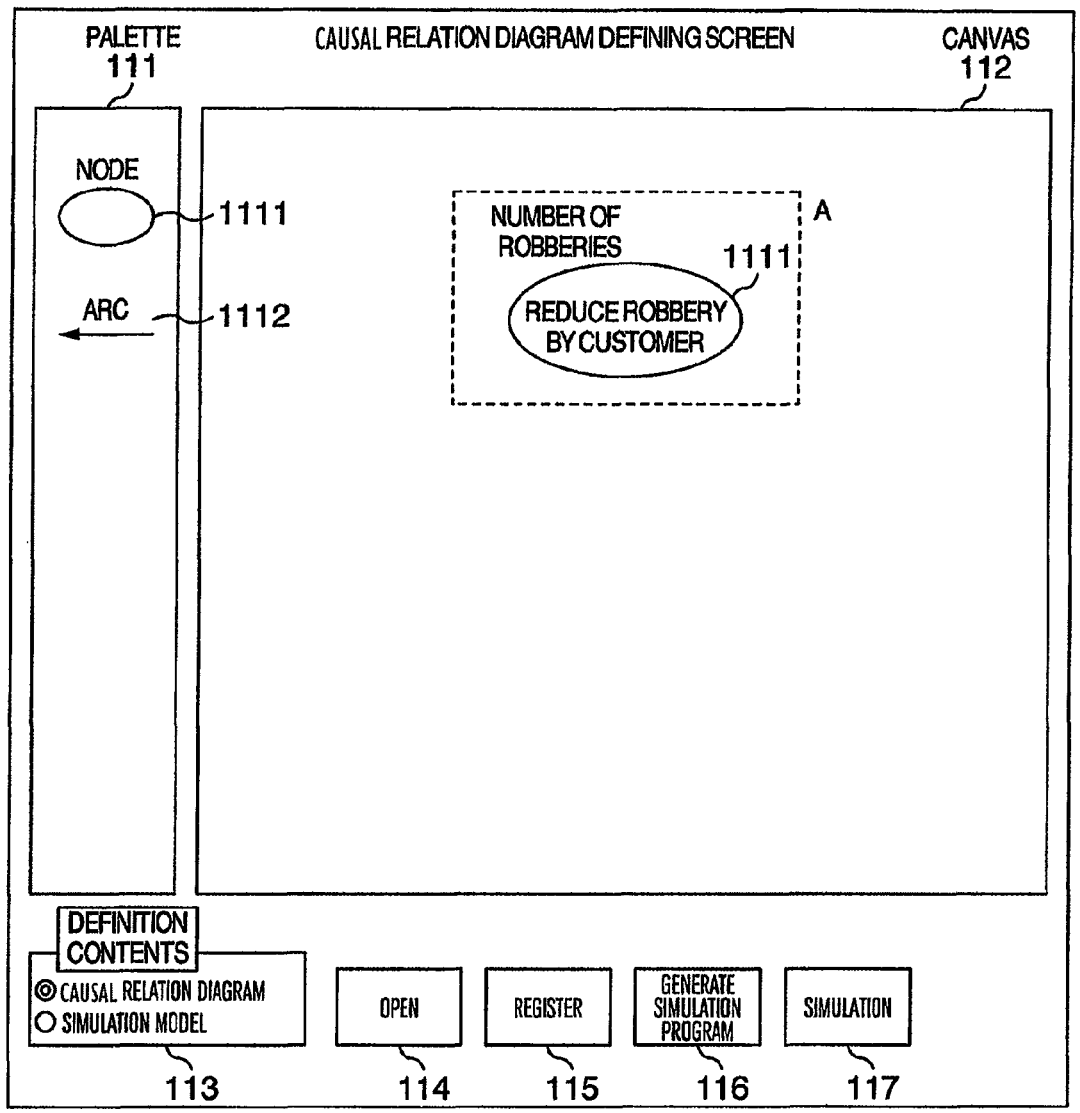
FIG. 4 is a diagram showing a screen for a causal relation diagram defining unit.
FIG. 5 is a diagram showing a node setting screen.

The causal relation diagram defining unit 11 has a function of writing the items such as phenomena and events as nodes, generating the causal relation by coupling the nodes with arcs, and writing a causal relation diagram by setting the metrics to each node. FIG. 4 is a diagram showing a screen for the causal relation diagram defining unit 11. In FIG. 4, a canvas 112 is an area where the causal relation diagram is defined. In the left side of the screen, a palette 111 is disposed which has objects, a node 1111 and an arc 1112. The causal relation diagram is drawn by dragging and dropping the objects on the canvas 112 with a mouse. For example, when a node "reduce robbery by customer" written at A in FIG. 4 is drawn, the node object on the palette 111 is dragged and dropped at the position A. After drag and drop, a node setting screen is displayed. FIG. 5 is a diagram showing the node setting screen. The image at A in FIG. 4 is drawn by setting "reduce robbery by customer" and "number of robberies" to the items of a node name and a metrics. The operation is repeated to couple the causal relation among nodes 1111 with arcs 1112.

FIG. 6 shows an example of a created causal relation diagram. A node 1111 contacting the head of an arc 1112 is called an effect node, and a node 1111 contacting the root of an arc is called a cause node.

As a node is double-clicked with the mouse, a node setting screen is displayed corresponding to the node. It is therefore possible to change the names of a node and a metrics once set.

As a register button 115 is depressed, data generated up to this point can be stored in the database 2. FIG. 7 is a diagram showing a registration confirmation screen to be displayed when the register button 115 is depressed. When a model name is input and an OK button is depressed, the system stores the data generated up to this point in tables shown in FIGS. 8 and 9.

FIG. 8 is a diagram showing a node table 201 for storing node information of a causal relation diagram. The table has fields including model names and node names registered, coordinate values, widths and heights of drawing areas.

FIG. 9 is a diagram showing an arc table 202 for storing arc information coupling nodes. The table has fields including arc ID's for uniquely identifying arcs, cause node names and effect node names. For example, a record having an arc ID "1" corresponds to an arc extending from a node "abandon robbery" to a node "reduce robbery by customer".

Next, description will be made on the simulation model defining unit 12 shown in FIG. 3. The simulation model defining unit 12 has a function of adding a variable necessary for calculating the metrics to the model inheriting the structure of the causal relation diagram drawn by the causal relation diagram defining unit 11, and setting a calculation formula relative to the variable and metrics.

Figure 10:
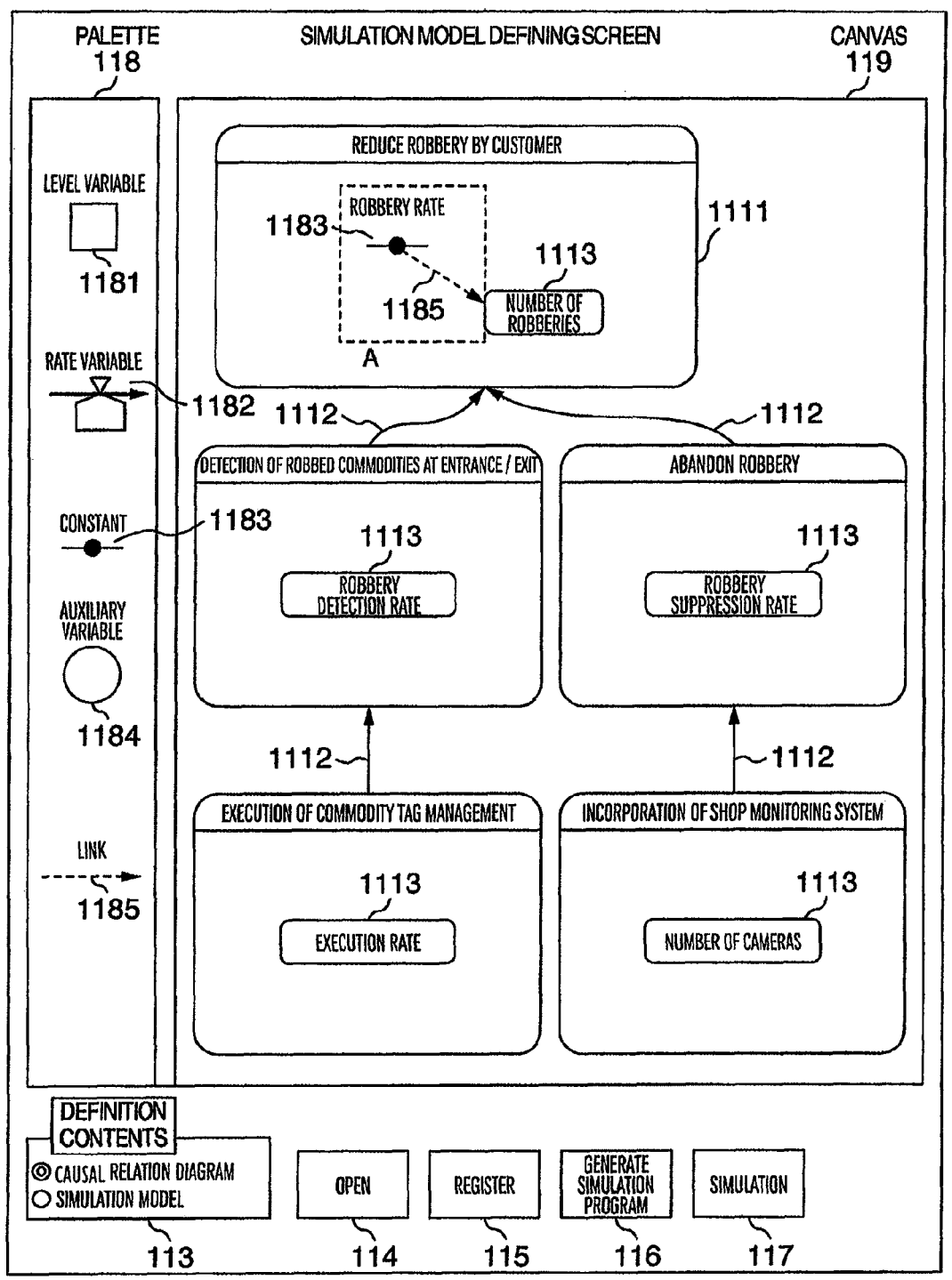
FIG. 10 is a diagram showing a screen for a simulation model defining unit.

FIG. 10 is a diagram showing a screen for the simulation model defining unit 12. A canvas 119 is an area where a simulation model is drawn. Drawn in this area as a default are the causal relation between the nodes 1111 and arcs 1112 drawn by the causal relation diagram defining unit 11, and the items of the metric 1113 set to the nodes 1111. In the left side of the screen, a palette 118 is disposed for adding variables necessary for calculating the metrics 1113. The palette 118 has a rate variable 1182 representative of a flow amount of articles, information or the like per unit time, a level variable 1181 representative of an accumulation amount of flow rates, a constant 1183, a variable object of the type like an auxiliary variable 1184, and a link object 1185 representative of a flow direction of information. These objects are dragged and dropped at the canvas 119 to add variables necessary for calculating the matrix. For example, when a "robbery rate" constant 1183 at A in FIG. 10 is to be added, the constant 1183 on the palette 118 is dragged and dropped at the position A. After drag and drop, a calculation model defining screen is displayed.

Figure 11:
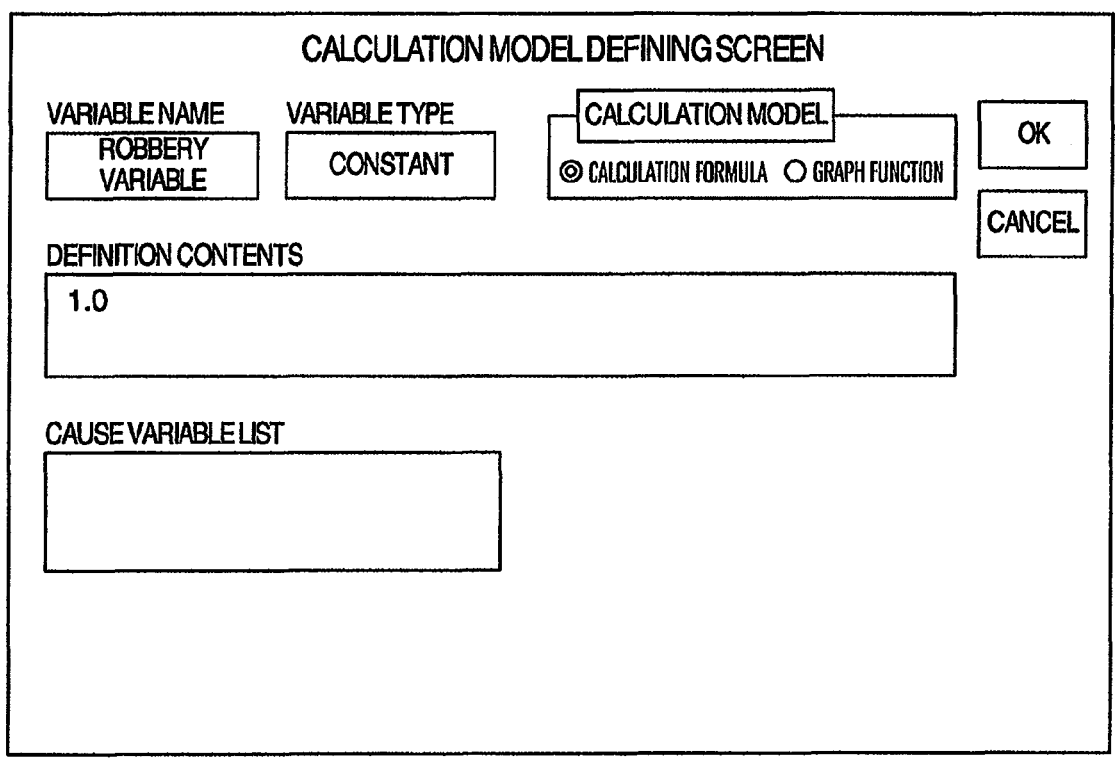
FIG. 11 is a diagram showing a calculation mode defining screen when a calculation model is for a calculation formula.

FIG. 11 is a diagram showing the calculation model defining screen. The screen displays items including a variable name, a type of the variable (level variable 1181, rate variable 1182, constant 1183, auxiliary variable 1184 and metrics 1113), a calculation model for determining a calculation method for the variable, the definition contents for setting a specific calculation formula for the variable, and a cause variable list.

The "calculation formula" for the calculation model is used when a calculation formula or a numerical value is set to the variable. The calculation formula and numerical value are set to the item of the definition contents. For example, if the robbery rate is to be set to "1.0", "robbery rate" is set to the item of the variable name, and "1.0" is set to the item of the definition contents as shown to thereby draw a "robbery rate" constant 1183 at A in FIG. 10. For example, if the "robbery rate" constant 1183 is required to calculate the "number of robberies" metrics 1113, an arrow link 1185 is extended from the "robbery rate" to "number of robberies". A variable contacting the head of the arrow link 1185 is called an effect variable, and a variable connecting the root is called a cause variable.

In FIG. 10, when the register button 115 is depressed, information on the defined simulation model is stored in tables shown in FIGS. 12 and 13.

FIG. 12 is a diagram showing a variable table 203 for storing variable information of the simulation model. The table has fields including model names and node names registered, coordinate values, widths and heights of drawing areas, node names, calculation models and definition contents using the variable.

FIG. 13 is a diagram showing a link table 204 for storing information on links coupling variables. The table has fields including model names registered, link ID's for uniquely distinguishing links, cause variable names and effect variable names. For example, data corresponding to a link extending from a "robbery rate" constant 1183 to a "number of robberies" metrics 1113 corresponds to a record having a link ID field of "3".

Figure 14:
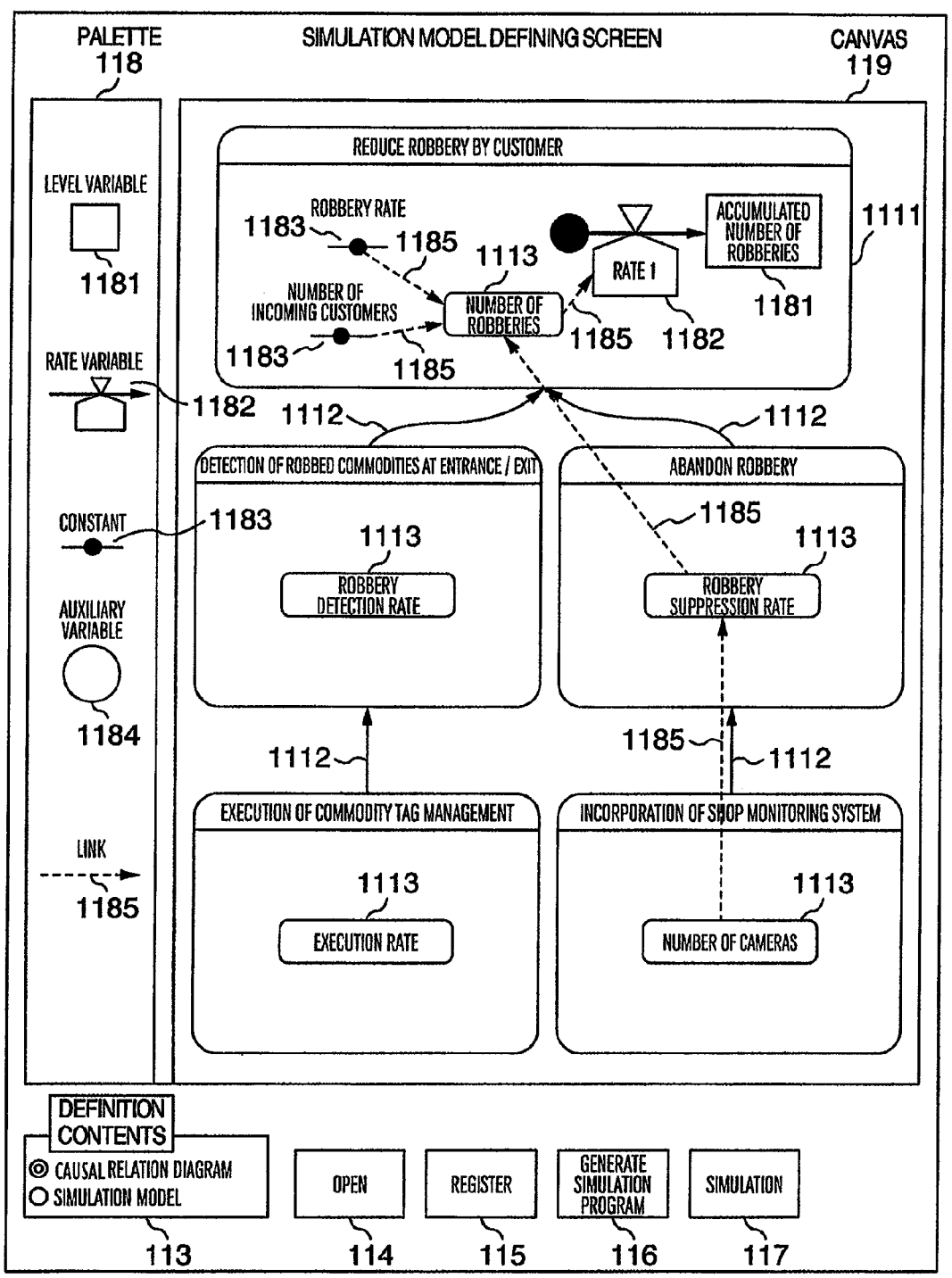
FIG. 14 is a diagram showing a simulation model defining screen with input data.

FIG. 14 is a diagram showing an example wherein the simulation model shown in FIG. 10 is added with a "number of incoming customers" constant 1183, a "accumulated number of robberies" rate variable 1181, a "rate 1" rate variable 1182 and various links 1185. By double-clinking an object of each variable, a corresponding calculation model defining screen is displayed.

FIG. 15 is a diagram showing the calculation model defining screen using the "number of robberies" metrics 1113 as an example. Cause variables "robbery suppression rate", "number of incoming customers" and "robbery rate" having links extended to the metrics are displayed in the item of a cause variable list. In the definition contents item, if all the variables in the cause variable list are not incorporated in the calculation formula, an error occurs. If a variable not contained in the cause variable list is incorporated in the calculation formula, an error occurs also.

Next, with reference to FIG. 16, description will be made on the calculation model for a graph function which is used if the calculation model can be defined as a tendency although it is difficult to define as a calculation formula and numerical value.

FIG. 16 is a diagram showing a calculation model defining screen using the "robbery suppression rate" metrics 1113 as an example. The screen includes a graph area where a graph is drawn by plotting the relation between an input variable x (number of cameras) and an output variable y (robbery suppression rate), and a table for setting coordinate values of plots. Since the cause variable list is displayed in a list of the x-axis, a proper variable is selected from the list to set each y value for each x value. A step width of each x value is set to the step value. A definition range is set by entering numerical values in the items of a lower limit and a higher limit, and a value range is set by entering numerical values in the items of a Y lower limit and a Y higher limit. Description will be made on the format of each y value set for each x value when the values are registered in the database, by using the record at B in FIG. 12. All values set on the screen are registered in the definition contents field. In the registration format, the items including the X-axis variable, definition range lower limit, definition range higher limit, step for the x-axis step width, and Y coordinate values of each plot is delimited by a comma, whereas the Y coordinate values are delimited by a slash. As a line surrounding variables registered as a graph function, a bold line is used to allow also the simulation model defining screen to distinguish whether the calculation model set to each variable is a calculation formula or a graph function.

Figure 17:
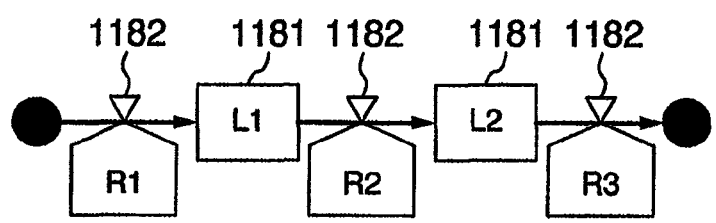
FIG. 17 is a diagram showing level variables and rate variables serially connected.

Level variables 1181 and rate variables 1182 may be serially connected in the simulation model defining screen. FIG. 17 shows an example of a serial connection. Information on the structure of a serial connection is registered as a record having a model name field of "model 2" in the link table 204 of FIG. 13. The simulation model defining screen and causal relation diagram defining screen can be freely switched by selecting the fields of "simulation model" and "causal relation diagram" in the definition contents 113.

Figure 18:
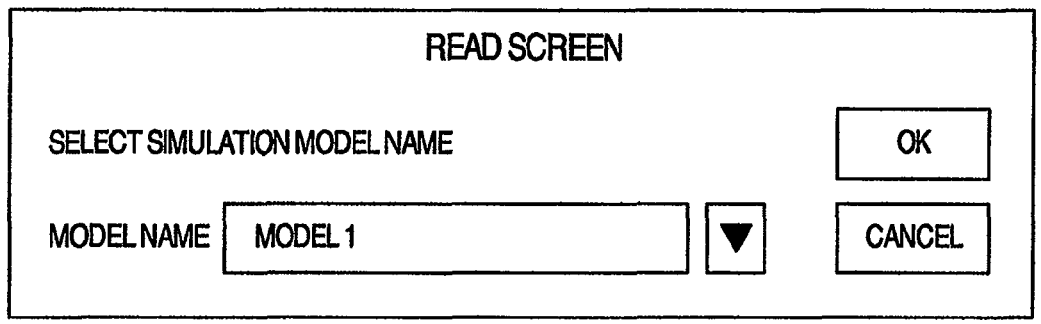
FIG. 18 is a diagram showing a screen for reading a simulation model.

By depressing an open button 114, a simulation model registered in the past can be read. As the open button 114 is depressed, a read screen such as shown in FIG. 18 is displayed. A model to be read is selected from a model name list, and an OK button is depressed. The model name list displays a collection of various records in the model name field of the node table 201.

Next, description will be made on the simulation program generating unit 13 shown in FIG. 3. The simulation program generating unit 13 has a function of automatically generating a simulation program in accordance with the data registered in the database 2. With reference to the flow chart of FIG. 19, description will be made on the operation sequence of generating the simulation program.

First, after a simulation model name, a simulation period and a time bucket are obtained, these are set as parameters to a program template 131, and an equation for setting a simulation period is generated (Steps 1 and 2). FIG. 20 is a diagram showing the program template 131. For example, the equation is generated in the output field when "30" and "1" are set as the parameters of the simulation period and time bucket.

A record whose model name field is coincident with the simulation model name obtained at Step 1 is acquired from the variable table 203 shown in FIG. 12 having the fields including the model name, variable name, variable type, calculation model, definition contents and the like (Step 3). If the variable field type of the obtained record is the level variable, a record whose cause variable name is coincident with the subject variable name is extracted from the link table 204 shown in FIG. 13 (Steps 4 and 5). Similarly, a record whose effect variable name is coincident with the subject variable name is extracted from the link table 204 shown in FIG. 13 to obtain a corresponding cause variable name (Step 6). The cause variable name, effect variable name, definition contents and subject variable name are set as parameters to a program template 132, to additionally write the level equation to the simulation program 40. FIG. 21 is a diagram showing the program template 132. This program template is a template for the simulation program constituted of an equation for setting an initial variable (first row) and a level equation for calculating the value of a next simulation time step (second row). When the level equation is generated by using this template, for example, by setting an initial value "0" to "L1" shown in FIG. 17, the parameter values of the subject variable name, definition contents, cause variable name and effect variable name become "L1", "0", "R1" and "R2" as shown in an input column shown in FIG. 21 to thereby automatically generate the program such as shown in an output column.

If the variable type is not the level variable at Step 4, it is checked whether the value of the calculation model is coincident with the "calculation formula" (Step 8). If coincident, the parameters constituted of the subject variable name, definition contents, and variable type of the subject variable are set to a program template 133 to thereafter additionally write the equation for the calculation formula to the simulation program 40 (Step 9).

FIG. 22 is a diagram showing the program template 133. This template is a template for converting the calculation formula or numerical value set as the parameter of the definition contents into a simulation program. For example, if the parameters of the subject variable name, definition contents and variable type are "R1", "3" and "rate variable", the subject variable name and the definition contents value are set to the program template 133. As the parameters of the equation type and suffix, the values of the equation type and suffix in a record having a coincident variable type are acquired from a variable type correspondence table shown in FIG. 23. In this example having the "rate variable" as the variable type, the values of the equation type and suffix are "R" and ".KL". Thereafter, the simulation program is generated in an output column shown in FIG. 22.

If the calculation model is not coincident with the "calculation formula" at Step 8, i.e., if the calculation model is the "graph function", the values of the definition contents are decoded into the parameters constituted of the "x-axis variable", "definition range lower limit", "definition range upper limit", "step" representative of an x-axis step width, and "each Y coordinated value", as in the record at B in the variable table 203 shown in FIG. 12 (Step 10). These parameters and subject variable name are set to a program template 134, and an equation for the graph function is additionally written (Step 11).

FIG. 24 is the diagram showing the program template 134. This program template 134 is a template for a program for defining the relation between an input x and an output y by directly setting the values x and y if the values x and y are difficult to be expressed by a calculation formula. The relation definition between x and y is realized by using a TABLE function which is a built-in function of DYNAMO. For example, if the parameters are those in an input column of FIG. 24, a program is generated in an output column.

At the last Step 12, if data satisfying the conditions of Step 3 contains the next record, then the flow returns to a process at Step 3, whereas if the next record is not contained, the flow is terminated.

With the above-described operation sequence, a simulation program can be generated automatically.

Next, description will be made on an example of an automatically generated simulation program. It is assumed that a simulation model to be automatically generated has the structure shown in FIG. 14 and that the contents set to each variable are registered as a record of the "model 1" in the variable table 203 shown in FIG. 12 and the link table 204 shown in FIG. 13. FIG. 25 shows an example of a corresponding simulation program 40.

It is assumed that a simulation model to be automatically generated has the structure shown in FIG. 17 and that the contents set to each variable are registered as a record of the "model 2" in the variable table 203 shown in FIG. 12 and the link table 204 shown in FIG. 13. FIG. 26 shows an example of a corresponding simulation program 40.

Lastly, as a simulation button 117 on the simulation model defining screen is depressed, the simulator 4 executes the simulation program 40 automatically generated by the simulation program generating unit 13 shown in FIG. 3, and outputs simulation results.

In this embodiment, as described so far, simulation becomes possible by defining the structure of a causal relation, defining a variable necessary for calculating the metrics and a calculation formula for the variable and metrics, relative to a simulation model inheriting the defined causal relation structure, and automatically generating a simulation program.

Since a simulation model can be defined in accordance with the structure of a causal relation easy to be understood by human, a development period for the simulation program can be shortened greatly. Even a novice not having the knowledge of system dynamics can generate the simulation model and simulate various phenomena.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A simulation model defining system for generating a simulation program for a simulator simulating a behavior of economy or society regarded as a system of phenomena and events, a relation between constituent elements of the system being represented by a causal relation, comprising:

a causal relation diagram defining unit, for representing a user interface screen of a causal relation among phenomena and events structured into nodes and arcs of a causal relation diagram, to receive definitions of nodes and arcs and settings of metrics from a user, and storing metrics information of a node name, node information and drawing information of each of the nodes and arc information of arcs each combining an effect node and a cause node into a database;

a simulation model storing unit, for representing a user interface screen of a simulation base model inheriting a structure of the causal relation of said causal relation diagram for input from said user of a variable necessary for calculating said metrics to the simulation base model and setting a calculation formula relative to said metrics and said variable, to receive at least one of a rate variable representative of a flow amount of articles or information per unit time, a level variable representative of an accumulation amount of flow rates, a constant, a variable object, and a link object representative of a flow direction of information, a selection of a calculation model for determining a calculation method for the variable, definition contents for setting a specific calculation formula for the variable, and a selection of a graph function to define as a calculation formula and numerical value plotted between an input variable and an output variable from said user, so as to display variable objects and link objects inputted at the simulation model definition screen and to store a simulation model in a variable table and a link table of the database; and a simulation program generating unit, for reading simulation model data from the database in response to receiving a simulation model name, a simulation period and a time bucket of simulation received, and if a variable type is a level variable, extracting cause and effect variable names corresponding to the level variable to generate a simulation program for a template including an equation for calculating a value of a next simulation step, and if a variable type is not a level variable and if a calculation model is coincident with a calculation formula, generating a simulation program by using a template including of an equation, a variable of a calculation formula, and definition content of a variable, and if a variable type is not a level variable and if a calculation model is a graph function, reading simulation model data defining a graph of the variable from the database to generate a simulation program for a template constituted of an input variable and an output variable for the graph function.

2. The simulation model defining system according to claim 1, wherein said simulation program generating unit:

preparing in advance program templates of three types including "for data storage", "for calculation" and "for graph function";

if the variable type in said variable table is a level variable "for data storage", adopting the program template for data storage as the calculation formula of the subject variable;

if the variable type in said variable table is not a level variable for data storage and the calculation model is "for calculation", adopting the program template for calculation as the calculation formula of the subject variable; and if the variable type in said variable table is not a level variable for data storage and the calculation model is "for graph function", adopting the program template for graph function as the calculation formula of the subject variable, to generate the simulation program.

* * * * *